United States Patent
King et al.

(10) Patent No.: US 6,693,749 B2
(45) Date of Patent: Feb. 17, 2004

(54) LOW-OBSERVABILITY, WIDE-FIELD-OF-VIEW, SITUATION AWARENESS VIEWING DEVICE

(75) Inventors: William B. King, Rancho Palos Verdes, CA (US); Chungte W. Chen, Irvine, CA (US); Ronald G. Hegg, Vista, CA (US); John E. Gunther, Morgan Hill, CA (US); Richard W. Nichols, Manhattan Beach, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 09/774,495

(22) Filed: Jan. 31, 2001

(65) Prior Publication Data

US 2002/0101664 A1 Aug. 1, 2002

(51) Int. Cl.[7] ............................. G02B 27/14; G02B 27/28
(52) U.S. Cl. ........................................ 359/630; 359/486
(58) Field of Search .................................. 359/618, 629, 359/630, 631, 632, 496, 486, 488, 487

(56) References Cited

U.S. PATENT DOCUMENTS

| | | | | |
|---|---|---|---|---|
| 4,012,671 A | * | 3/1977 | Vaice | 250/573 |
| 4,289,381 A | | 9/1981 | Garvin | |
| 5,245,472 A | * | 9/1993 | Hegg | 359/496 |
| 5,289,434 A | * | 2/1994 | Berni | 356/345 |
| 5,357,372 A | * | 10/1994 | Chen et al. | 359/630 |
| 5,383,053 A | | 1/1995 | Hegg et al. | |

(List continued on next page.)

FOREIGN PATENT DOCUMENTS

| | | |
|---|---|---|
| EP | 0 566 004 A | 10/1993 |
| EP | 0 825 470 A | 2/1998 |

OTHER PUBLICATIONS

Schnabel B. et al.: "Study on Polarizing Visible Light by Subwavelength–Period Metal–Stripe Gratings", Optical Engineering, Soc, of Photo–Optical, Feb. 99.

Bernd Schnabel et al., Study on polarizing visible light by subwavelength–period metal–stripe gratings, Opt.Eng. vol. 38(2), pp. 220–226 (Feb. 1999).

*Primary Examiner*—Georgia Epps
*Assistant Examiner*—Alicia M Harrington
(74) *Attorney, Agent, or Firm*—Colin M. Raufer; Glenn H. Lenzen, Jr.

(57) ABSTRACT

A situation awareness viewing device, typically in the form of a head-mounted display device, includes a polarizing beam splitter made of a cube of a material transparent to light and having an index of refraction greater than 1, and a wire grid polarizer lying within the cube on a cube-diagonal plane extending between two diagonally opposed edges of the cube. The polarizing beam splitter has a first optical axis extending from a first face of the cube toward an opposing second face of the cube and lying at an angle of 45 degrees to the cube-diagonal plane, and a second optical axis extending from a third face of the cube toward an opposing fourth face of the cube and lying at an angle of 45 degrees to the cube-diagonal plane, the second optical axis being perpendicular to the first optical axis. The device further includes an external polarizer external to the cube on the first optical axis and disposed to intercept light incident upon the first face along the first optical axis, an image source external to the cube and disposed to send a display image incident upon the third face along the second optical axis, a quarter-wave plate external to the cube and disposed to intercept a beam of light traveling along the second optical axis and passing out of the cube through the fourth face, and a mirror external to the cube and disposed to reflect light passing through the quarter-wave plate back through the quarter-wave plate and to the fourth face.

25 Claims, 2 Drawing Sheets

U.S. PATENT DOCUMENTS

| | | | | |
|---|---|---|---|---|
| 5,467,205 A | * | 11/1995 | Kuba et al. | 359/630 |
| 5,526,184 A | * | 6/1996 | Tokuhashi et al. | 359/630 |
| 5,581,271 A | * | 12/1996 | Kraemer | 359/630 |
| 5,598,296 A | * | 1/1997 | Imaizumi | 359/421 |
| 5,828,489 A | * | 10/1998 | Johnson et al. | 359/487 |
| 5,880,889 A | * | 3/1999 | Neumann et al. | 359/634 |
| 6,108,131 A | * | 8/2000 | Hansen et al. | 359/486 |
| 6,243,199 B1 | | 6/2001 | Hansen et al. | |

* cited by examiner

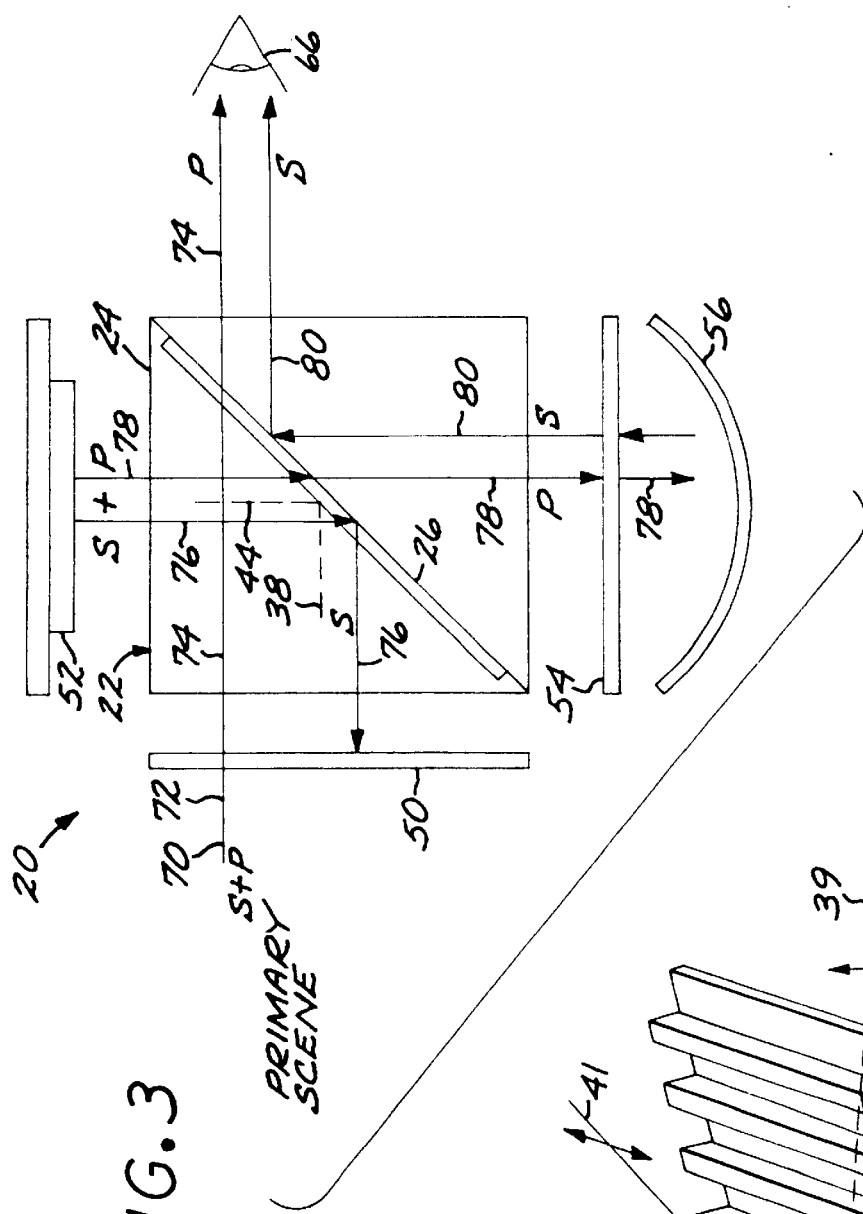
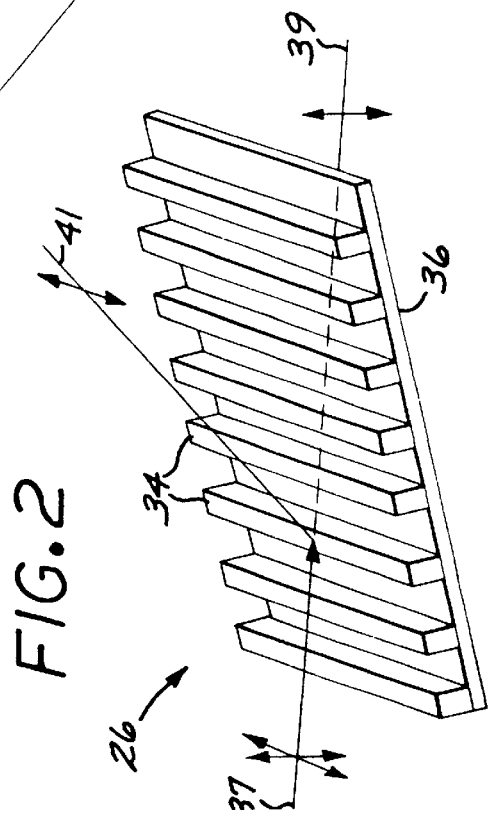

LOW-OBSERVABILITY, WIDE-FIELD-OF-VIEW, SITUATION AWARENESS VIEWING DEVICE This invention relates to an optical viewing device that permits a person to simultaneously view a scene and also view a superimposed display of other information and, more particularly, to such a device in the form of a head-mounted display with a wide field of view and low observability.

BACKGROUND OF THE INVENTION

The ready availability of a wide variety of information is becoming increasingly important to combat soldiers, law-enforcement personnel, and others exposed to potentially dangerous situations. Head-mounted displays have been developed to allow the wearer to view a primary scene directly, and simultaneously to view a display of the same or another scene, a map, and/or tactical data. In general, such displays include a line of sight to the primary scene, an image source for the display of the other information, and a beam combiner that mixes the display image from the image source into the direct view of the primary scene.

There are several technical challenges to the implementation of such systems. One such challenge is achieving good display image intensity in a wide range of daylight and darkness situations, while keeping the weight of the head-mounted device acceptably low. Another is providing a wide field of view of the primary scene. If the field of view is too small, the advantages of the availability of the additional information are outweighed by the reduced visibility of the primary scene caused by overlay occlusion.

Yet another problem with such head-mounted displays used by soldiers, law-enforcement personnel, and others in combat situations, as compared with those who are not in combat, is that the head-mounted display must have a low observability to opponents. If some significant amount of the light generated by the display escapes from the device in the forward direction, that escaped light may allow the opponent to locate and target the user of the device, especially in low-light-level conditions. It is therefore important that no substantial amount of light escapes from the device in a forward direction so as to be visible to the opponent.

While head-mounted displays are known, there is a need for a device that combines the features of a wide field of view, good scene and display image intensity to the user, and low observability to opponents. The present invention fulfills this need, and further provides related advantages.

SUMMARY OF THE INVENTION

The present invention provides a situation awareness viewing device, preferably in the form of a head-mounted display, enabling a wide field of view (on the order of 40 degrees in the inventors' prototype), good scene and display image intensity for the user, and low observability in the forward direction away from the user. The polarizing performance of the device is nearly independent of incident wavelength in the visible range, so that it may be used with a color image source. The device is light in weight and has good optical performance and convenience for the user. It is also compact, with a prototype being designed to fit within a 1-inch cube.

In accordance with the invention, a situation awareness viewing device includes a polarizing beam splitter comprising a cube of a material transparent to light and having an index of refraction greater than 1, and a wire grid polarizer lying within the cube on a cube-diagonal plane extending between two diagonally opposed edges of the cube. The material transparent to light is preferably transparent to visible light, and most preferably is a plastic. The polarizing beam splitter has a first optical axis extending from a first face of the cube toward an opposing second face of the cube and lying at an angle of 45 degrees to the cube-diagonal plane, and a second optical axis extending from a third face of the cube toward an opposing fourth face of the cube and lying at an angle of 45 degrees to the cube-diagonal plane. The second optical axis is perpendicular to the first optical axis. The device further includes an external polarizer external to the cube on the first optical axis and disposed to intercept light incident upon the first face along the first optical axis, an image source external to the cube and disposed to send a display image incident upon the third face along the second optical axis, a quarter-wave plate external to the cube and disposed to intercept a beam of light traveling along the second optical axis and passing out of the cube through the fourth face, and a mirror external to the cube and disposed to reflect light passing through the quarter-wave plate back through the quarter-wave plate and to the fourth face. The mirror preferably is a spherical concave mirror. These components are desirably supported in a head mount.

In another embodiment, a situation awareness viewing device includes a polarizing beam splitter comprising a wire grid polarizer that may or may not lie within a solid cube of a material transparent to light and having an index of refraction greater than 1. The polarizing beam splitter has a first optical axis lying at an angle of 45 degrees to the wire grid polarizer, and a second optical axis lying at an angle of 45 degrees to the wire grid polarizer and perpendicular to the first optical axis. An external polarizer lies on the first optical axis on a first side of the wire grid polarizer, an image source lies on the second optical axis on the first side of the wire grid polarizer disposed to send a display image toward the wire grid polarizer along the second optical axis, a polarization direction changing device lies on the second optical axis on a second side of the wire grid polarizer, and a mirror lies on the second optical axis such that the polarization direction changing device is between the mirror and the wire grid polarizer. The mirror is disposed to reflect light traveling along the second optical axis back through the polarization direction changing device. In both embodiments, the some or all of the elements may be laminated or bonded together so that there are no air gaps therebetween, or the elements may be spaced apart with air gaps therebetween.

The use of the wire grid polarizer in the present design yields important benefits in this application that are not achieved with other polarizers or by the wire grid polarizer in other applications. The wire grid polarizer utilizes metallic stripes to achieve the polarization, not a dielectric stack. The wire grid polarizer has a high reflectivity for s-polarized light and a high transmission of p-polarized light, with the s- and p-polarization defined relative to the wire grid polarizer features as will be discussed subsequently. It may therefore be used with an unpolarized light image source, an important advantage because unpolarized light image sources are available with much higher brightnesses than the available polarized light image sources. In some prior head-mounted displays, the brightness of the polarized image source was so low that a mechanism had to be provided to darken the image of the primary scene so as not to obscure the image of the image source, adding to the weight, size, and complexity of the device. That is not necessary with the present approach.

The wire grid polarizer retains its polarizing capability even for incident light at a relatively high angle of incidence.

The result is that the device has a wide field of view. The wire grid polarizer has low net attenuation of the light from the primary scene and from the display image source, so that the user views on the order of 30 percent or more of the initial light intensity of the primary scene and the projected display image. The wire grid polarizer transmits p-polarized light from the image source and reflects s-polarized light in the forward direction away from the user. However, the external polarizer intercepts and blocks this reflected s-polarized light so that very little if any light escapes from the situation awareness viewing device.

The present approach allows the use of an unpolarized image source, which has a higher image intensity than a polarized image source such as a plane-polarized liquid crystal display. If the plane-polarized image source is used, the polarized emitted light that is incident upon the polarizing beam splitter must be p-polarized so that it may pass through the polarizing beam splitter. None of this p-polarized energy may be reflected by the polarizing beam splitter outwardly from the device, so no polarizing device comparable with the p-oriented polarizer of the present approach is needed to achieve low observability. On the other hand, the p-polarized liquid crystal display has a relatively low image intensity and therefore cannot satisfactorily serve as the image source in a situation awareness viewing device.

The situation awareness viewing device permits operation at night where little or no background light precludes the user from seeing the world. In this case, the subject display system may be used to project a generic night vision-generated scene into the user's wide field of view head mounted display, with ancillary data superimposed onto the night vision scene. The projected night vision image may or may not be boresighted to the user's line of sight.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 is a perspective view of a wire grid polarizer; and

FIG. 3 is a ray path drawing for the polarized light components in the situation awareness viewing device.

DETAILED DESCRIPTION OF THE INVENTION

Figure 1:
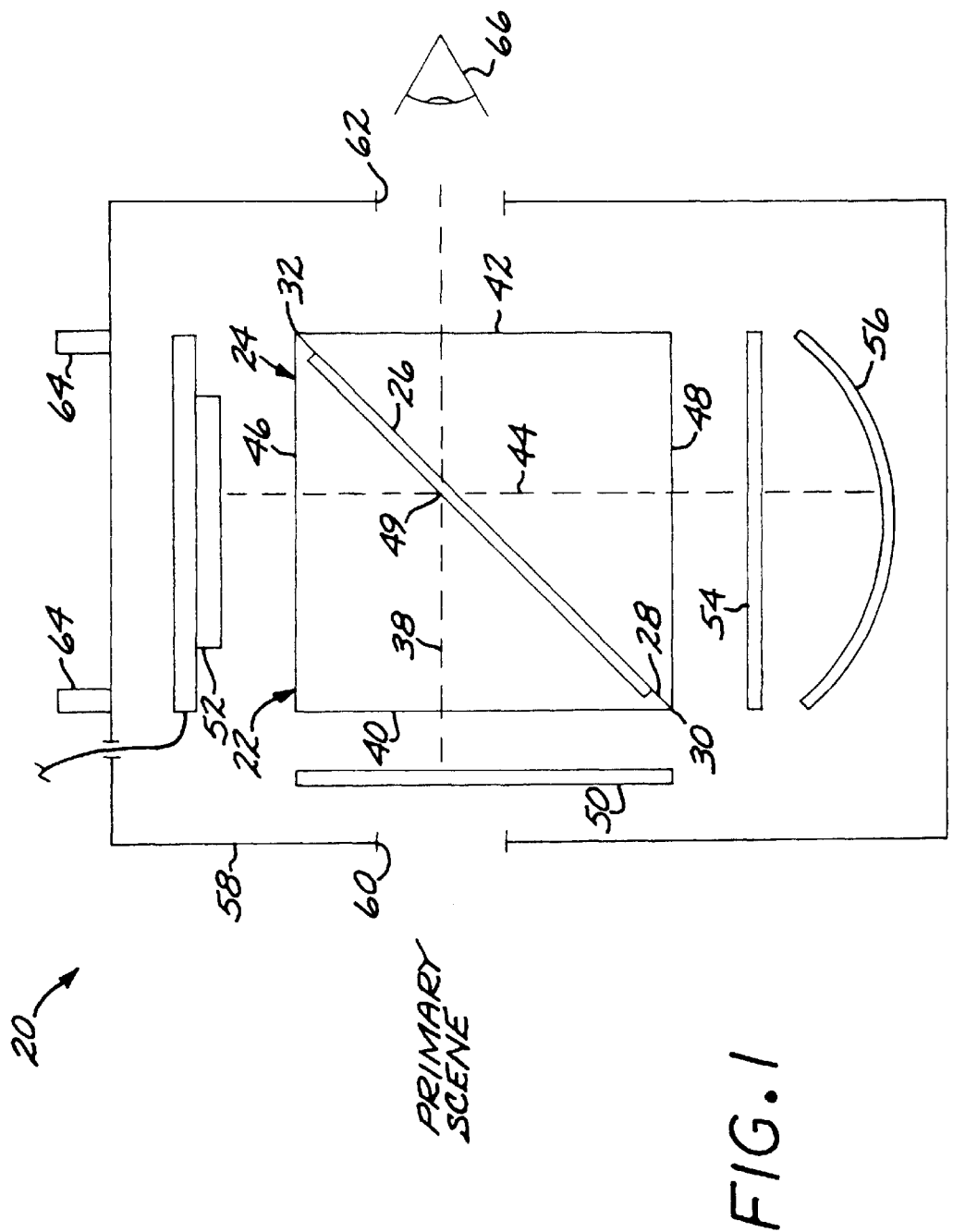
FIG. 1 is a schematic drawing of the situation awareness viewing device.

FIG. 1 depicts a situation awareness viewing device 20 in the preferred form of a head-mounted unit that views a Primary Scene. The depicted Primary Scene may be a directly viewed external scene (so that the situation awareness viewing device 20 is a see-through device), or it may be a generated display of the external scene such as an infrared image (so that the situation awareness viewing device 20 is not a see-through device). The situation awareness viewing device 20 may be controllably alternated between a see-through configuration and a non-see-through configuration using a movable generated image source that may be selectively positioned at the location indicated as Primary Scene in FIG. 1.

The situation awareness viewing device 20 includes a polarizing beam splitter 22 formed of a square parallelopiped, here depicted as and termed a cube 24, of a material transparent to light, preferably visible light. (As used herein, "cube" is a term of art and does not require that the dimensions along the three orthogonal axes be identical.) In a first embodiment, the cube 24 may be made of any transparent material such as glass or plastic. A high-quality, low-birefringent plastic of high uniformity, such as a cyclo-olefin plastic, is preferred for light weight and good optical properties. Such plastics are available under the trademark Zeonex from Nippon Zeon Co., an example being Zeonex E48R. In a second embodiment, the cube 24 is a frame containing air, a liquid, or other transparent substance having an optical power, and is thus termed an "air cube". That is, in the second embodiment the wire grid polarizer, to be described next, is supported in the interior space of what is described as the cube 24. In all cases, the material transparent to light has an index of refraction of greater than 1 (unity). The solid cube 24 of the first embodiment is preferred due to its more robust construction and its higher optical power, and it will be the primary subject of the following discussion.

A wire grid polarizer 26 lies within the cube 24 on an edge-to-edge cube-diagonal plane 28 extending between two diagonally opposed edges 30 and 32 of a square face of the cube 24. The wire grid polarizer 26 is a generally planar device that divides space into two portions, a first portion to a first side of the wire grid polarizer and a second portion to a second side of the wire grid polarizer. These sides of the wire grid polarizer may be used as references to describe the locations of features. The image source and external polarizer, to be described subsequently, are on the first side of the wire grid polarizer in the sense that they lie in the first portion of space to the first side of the wire grid polarizer. The quarter-wave plate, the mirror, and the eye of the user, to be described subsequently, are on the second side of the wire grid polarizer in the sense that they lie in the second portion of space to the second side of the wire grid polarizer. That an element lies "on a first side" or "on a second side" is only a relative reference to the position of the wire grid polarizer, and does not suggest that the element contacts the first side or the second side of the wire grid polarizer.

As shown in FIG. 2, the wire grid polarizer 26 is formed of an array of parallel metallic stripes 34 supported on a glass, plastic, or other transparent, electrically nonconducting substrate 36. Wire grid polarizers 26 are known in the art for other applications and are described, for example, in U.S. Pat. No. 4,289,381, whose disclosure is incorporated by reference, and Bernd Schnabel et al., "Study on polarizing visible light by subwavelength-period metal-stripe gratings, *Opt.Eng.* Vol.38(2), pages 220–226 (February 1999). For the present visible light application, the wire grid polarizer preferably comprises parallel aluminum metallic stripes on the glass substrate, with a spacing of about 150 nanometers.

The wire grid polarizer 26 has several operating characteristics of particular interest in the present application and which provide surprising and unexpected results in the present application. Referring to FIG. 2, an incident beam 37 of light is polarized by the wire grid polarizer 26 as a transmitted p-plane wave 39 and a reflected s-plane wave 41, with a high degree of efficiency. There is little energy lost from the incident beam 37. That is, the total of the energy in the waves 39 and 41 is nearly that of the incident beam 37. This polarizing performance is nearly independent of wavelength over the entire visible range, so that the wire grid polarizer 26 and the situation awareness viewing device 20 may be used either in monochrome or color applications. The polarizing performance of the wire grid polarizer 26 is also retained over a wide range of angle of incidence of the incident beam 37, so that the situation awareness viewing device 20 has a wide field of view of more than about 30 degrees and on the order of about 40 degrees (i.e.,+/−20 degrees) in the preferred construction. This is to be contrasted with other types of polarizing beam splitters. For example, a MacNeille polarizing beam splitter utilizing a multi-layer dielectric stack has polarizing performance that is limited to a narrow field of view of about +/−2 degrees before polarizing performance is degraded. Its polarization properties are dependent upon both angle of incidence and wavelength of the incident light, making it largely unsuitable for the present application of a situation awareness viewing device that requires a relatively wide field of view.

The polarizing beam splitter 22 is prepared by forming two 45 degree right-angle prisms of the transparent material. The wire grid polarizer 26 is captured between the two prisms to form the rectangular parallelopiped, preferably in the form of the cube 24. The wire grid polarizer 26 is "immersed" between the two prisms, so that there is substantially no air gap between the wire grid polarizer 26 and the prisms, or between the two prisms, that would produce a mismatch in the index of refraction and lead to unwanted reflections. The preferred embodiment has the metallic stripes of the wire grid polarizer oriented into the plane of the paper in FIGS. 1 and 3, but other orientations are possible.

The polarizing beam splitter 22 may be described as having a first optical axis 38 extending from a first face 40 of the cube 24 toward an opposing second face 42 of the cube 24. The first optical axis 38 lies at an angle of 45 degrees to the cube-diagonal plane 28. A second optical axis 44 extends from a third face 46 of the cube 24 toward an opposing fourth face 48 of the cube 24. The second optical axis 44 lies at an angle of 45 degrees to the cube-diagonal plane 28. The second optical axis 44 is perpendicular to the first optical axis 38 at a point of intersection 49.

An external polarizer 50 is positioned external to the cube 24. The external polarizer 50 is disposed to intercept light incident in either direction upon the first face 40 along the first optical axis 38. The external polarizer 50 passes p-oriented light and absorbs s-oriented polarized light, with the polarizations defined by the optical axis of the polarizer. The preferred external polarizer 50 is a Polaroid HN42HE thin film polarizer that permits only about 0.04 percent of the incident s-polarized light to pass therethrough.

An image source 52 is positioned external to the cube 24. The image source is disposed to send a display image incident upon the third face 46 along the second optical axis 44. The image source 52 may be of any operable type, with a light-emitting diode (LED) source preferred. Most preferably, the image source 52 is an active matrix organic light emitting diode (AMOLED), which is very efficient and of low power consumption to conserve the life of the battery that powers the image source 52. An important advantage of the present invention is that the image source 52 may be a source of unpolarized light, such as the light emitting diode. The use of an unpolarized source is permitted by the operation of the other optical elements, particularly the use of the wire grid polarizer rather than another type of polarizer. The unpolarized light source has a higher light output and brightness than a polarized light source, so that the image from the image source 52 reaching the eye of the user is relatively brighter. Consequently, special filters such as adjustable polarizers to reduce the intensity of the directly viewed scene are not needed and are not present in the preferred embodiment. If, on the other hand, the intensity of the viewed image from the image source 52 is relatively less bright, as is observed if the image source is a polarized light source such as a polarized liquid crystal display used in some prior devices, the viewed image from the image source 52 is difficult to see due to the much higher brightness of the directly viewed scene and some filter is typically required to reduce the brightness of the directly viewed scene. Such an additional filter adds complexity, weight, cost, and size to the device.

A polarization direction changing device, illustrated as a preferred quarter-wave plate 54, is positioned on the second optical axis 44 on the opposite side of the intersection 49 from the image source 52. The quarter-wave plate 54 is disposed to intercept a beam of light traveling along the second optical axis 44 and passing out of the cube 24 through the fourth face 48. For optimal performance, this quarter-wave plate 54 should be achromatic and zero order.

A mirror 56 is positioned on the second optical axis 44 with the quarter-wave plate 54 between the mirror 56 and the wire grid polarizer 26. The mirror 56, which is preferably a spherical or aspherical concave mirror that magnifies the incident display image, is disposed to reflect light passing through the quarter-wave plate 54 back through the quarter-wave plate 54 and to the fourth face 48. Other mirror arrangements having a comparable optical effect may be used. The present approach was selected for compactness. Having passed through the quarter-wave plate 54 twice, the plane of light polarization has now rotated 90 degrees, such that it is now reflected by the wire grid polarizer onto the first optical path 38 and is directed to the eye 66 of the user.

FIGS. 1 and 3 show the elements 50, 52, 54, and 56 as being separated from and spaced apart from the cube 24, so as to clearly illustrate these elements. This embodiment may be used, but in practice it is preferred that one or more, preferably all, of the elements 50, 52, 54, and 56 be laminated or bonded, as with optical cement, to the respective faces of the cube 24 for robustness and for optical performance. Air gaps are eliminated as to those elements which are laminated to the cube 24. The term "external" as used herein encompasses these various embodiments. "External" is used to provide a reference relative to the cube and is consistent with both the presence and the absence of an air gap.

The situation awareness viewing device 20 also desirably includes a housing 58 that contains the components 24, 26, 50, 52, and 54. The housing 58 has openings 60 and 62 therethrough to respectively allow entry of a scene image from the primary scene and viewing by a user. A head mount 64 supports the housing 58 and the contained components and positions them relative to the head of the user, here indicated by the user's eye 66. The head mount 64 may be of any operable type, such as the illustrated brackets that are affixed to a helmet, eyeglasses, visor, headband, and the like.

FIG. 3, which is similar to FIG. 1 but with the housing 58 removed, illustrates the ray paths and mode of functioning of the situation awareness viewing device 20 for a preferred embodiment. An incident light beam 70 from the primary scene (either the actual scene or a generated image) contains an s-polarized component 72 and a p-polarized component 74. The s-polarized component 72 is absorbed by and not transmitted through the p-oriented external polarizer 50 consistent with the polarizer's extinction ratio. The p-polarized component 74 passes through the wire grid polarizer 26 and to the eye 66 of the user as the image of the primary scene that is viewed by the user.

The display image produced by the image source 52 may be described as having an s-polarized component 76 and a p-polarized component 78. The p-polarized component 78 passes through the wire grid polarizer 26 to the quarter-wave plate 54, reflects from the mirror 56, and again passes through the quarter-wave plate 54. The quarter-wave plate 54 converts the p-polarized component 78 to an s-polarized component 80, which reflects from the wire grid polarizer 26 and to the eye 66 of the user as the viewed component of the display image.

The s-polarized component 76 from the image source 52 reflects from the wire grid polarizer 26 toward the primary scene. Unless prevented from passing out of the situation awareness viewing device 20, this reflected s-polarized component 76 would be projected forwardly and could be used by an opponent to locate and target the user. The p-oriented external polarizer 50 prevents the s-polarized component 76 from passing out of the situation awareness viewing device 20, so that the situation awareness viewing device 20 has a low observability characteristic. In the preferred case, the Polaroid HN42HE thin film polarizer permits only 0.04 percent of the light to escape in the forward direction outwardly from the situation awareness viewing device 20, resulting in very low observability.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A situation awareness viewing device, comprising:
   a polarizing beam splitter comprising
      a cube of a material transparent to light and having an index of refraction greater than 1, and
      a wire grid polarizer lying within the cube on a cube-diagonal plane extending between two diagonally opposed edges of the cube,
   the polarizing beam splitter having
      a first optical axis extending from a first face of the cube toward an opposing second face of the cube and lying at an angle of 45 degrees to the cube-diagonal plane, and
      a second optical axis extending from a third face of the cube toward an opposing fourth face of the cube and lying at an angle of 45 degrees to the cube-diagonal plane, the second optical axis being perpendicular to the first optical axis;
   an external polarizer external to the cube on the first optical axis and disposed to intercept light incident upon the first face along the first optical axis;
   an unpolarized image source external to the cube and disposed to send a display image incident upon the third face along the second optical axis;
   a quarter-wave plate external to the cube and disposed to intercept a beam of light traveling along the second optical axis and passing out of the cube through the fourth face; and
   a mirror external to the cube and disposed to reflect light passing through the quarter-wave plate back through the quarter-wave plate and to the fourth face.

2. The situation awareness viewing device of claim 1, wherein the mirror is a spherical concave mirror.

3. The situation awareness viewing device of claim 1, wherein the material transparent to light is a plastic.

4. The situation awareness viewing device of claim 1, wherein the material transparent to light is air.

5. The situation awareness viewing device of claim 1, further including
   a head mount supporting the polarizing beam splitter, the external polarizer, the image source, the quarter-wave plate, and the mirror.

6. The situation awareness viewing device of claim 1, wherein there is no adjustable polarizer present in the situation awareness viewing device.

7. The situation awareness viewing device of claim 1, wherein the external polarizer is not adjustable.

8. A situation awareness viewing device, comprising:
   a polarizing beam splitter comprising a wire grid polarizer, the polarizing beam splitter having
      a first optical axis lying at an angle of 45 degrees to the wire grid polarizer, and
      a second optical axis lying at an angle of 45 degrees to the wire grid polarizer and perpendicular to the first optical axis;
   an external polarizer lying on the first optical axis on a first side of the wire grid polarizer;
   an image source lying on the second optical axis on the first side of the wire grid polarizer disposed to send a display image toward the wire grid polarizer along the second optical axis;
   a polarization direction changing device lying on the second optical axis on a second side of the wire grid polarizer; and
   a mirror lying on the second optical axis such that the polarization direction changing device is between the mirror and the wire grid polarizer, the mirror being disposed to reflect light traveling along the second optical axis back through the polarization direction changing device.

9. The situation awareness viewing device of claim 8, wherein the mirror is a spherical concave mirror.

10. The situation awareness viewing device of claim 8, wherein the polarization direction changing device is a quarter-wave plate.

11. The situation awareness viewing device of claim 8, further including
    a head mount supporting the polarizing beam splitter, the external polarizer, the image source, the polarization direction changing device, and the mirror.

12. The situation awareness viewing device of claim 8, wherein the image source is an unpolarized image source.

13. The situation awareness viewing device of claim 8, wherein there is no adjustable polarizer present in the situation awareness viewing device.

14. The situation awareness viewing device of claim 8, wherein the external polarizer is not adjustable.

15. A situation awareness viewing device, comprising:
    an external polarizer on a first optical axis disposed to intercept light traveling along the first optical axis and incident upon the situation awareness viewing device from an external source;
    an unpolarized image source lying on a second optical axis that is perpendicular to and intersecting the first optical axis at an axis intersection;
    a polarization direction changing device lying on the second optical axis on a side of the axis intersection opposite to that of the image source and in facing relation to the image source, the polarization direction changing device also lying on the side of the axis intersection opposite to the polarizer on the first optical axis;
    a polarizing beam splitter comprising a beam-splitting polarizer lying at the intersection of the first optical axis and the second optical axis, the beam-splitting polarizer having a polarizing field of view of greater than about 10 degrees; and a mirror lying on the second optical axis such that the polarization direction changing device is between the mirror and the beam-splitting polarizer, the mirror being disposed to reflect light traveling along the second optical axis back through the polarization direction changing device.

16. The situation awareness viewing device of claim 15, wherein the beam-splitting polarizer has a polarizer plane inclined to the first optical axis at an angle of 45 degrees and inclined to the second optical axis at an angle of 45 degrees.

17. The situation awareness viewing device of claim 15, wherein the beam-splitting polarizer is a wire grid polarizer.

18. The situation awareness viewing device of claim 15, wherein the mirror is a spherical concave mirror.

19. The situation awareness viewing device of claim 15, wherein the polarization beam splitter is enclosed in a piece of a material transparent to light.

20. The situation awareness viewing device of claim 19, wherein the material transparent to light is transparent to visible light.

21. The situation awareness viewing device of claim 19, wherein the material transparent to light is a plastic.

22. The situation awareness viewing device of claim 15, further including a head mount supporting the polarizing beam splitter, the polarizer, the image source, the polarization direction changing device, and the mirror.

23. The situation awareness viewing device of claim 15, wherein the polarizing field of view is greater than about 30 degrees.

24. The situation awareness viewing device of claim 15, wherein there is no adjustable polarizer present in the situation awareness viewing device.

25. The situation awareness viewing device of claim 15, wherein the external polarizer is not adjustable.

* * * * *